(12) United States Patent
Kimura et al.

(10) Patent No.: US 6,298,325 B1
(45) Date of Patent: *Oct. 2, 2001

(54) SPEECH RECOGNITION SYSTEM FOR SEQUENCE DATA

(75) Inventors: Shinta Kimura; Yasuo Satoh, both of Kawasaki; Tomio Koide, Tachikawa, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,682

(22) Filed: Feb. 3, 1998

(30) Foreign Application Priority Data

Aug. 8, 1997 (JP) .................................................... 9-215306

(51) Int. Cl.⁷ ....................................................... G10L 15/18
(52) U.S. Cl. ............................................. 704/257; 704/273
(58) Field of Search .................................. 704/273, 257, 704/255, 250, 246, 243, 244; 434/185

(56) References Cited

U.S. PATENT DOCUMENTS

| | | | |
|---|---|---|---|
| 4,156,868 | * 5/1979 | Levinson | 704/251 |
| 4,907,278 | * 3/1990 | Cecinnati et al. | 704/246 |
| 5,428,707 | * 6/1995 | Gould et al. | 704/231 |
| 5,432,886 | * 7/1995 | Tsukada et al. | 704/239 |
| 5,457,768 | * 10/1995 | Tsuboi et al. | 704/231 |
| 5,634,086 | * 5/1997 | Rtischev et al. | 704/270 |

FOREIGN PATENT DOCUMENTS 6-214590   8/1994  (JP) .

* cited by examiner

Primary Examiner—William Korzuch
Assistant Examiner—Donald L. Storm
(74) Attorney, Agent, or Firm—Staas & Halsey LLP

(57) ABSTRACT

A speech recognition system recognizes voices from sequence data which is expected to be input in a regular, predetermined order. The speech recognition system includes a unit generating a recognition reference word by adding items of dummy data to each item of the sequence data, and a unit recognizing and outputting from among a set of recognition reference words that recognition reference word which is the most similar to an externally input voice. The recognition reference word is output as a recognized result on the basis of a feature of the input voice. Moreover, the dummy data are neighboring data which lie in a neighborhood of all items of the sequence data, thus forming the set of recognition reference words available for speech recognition.

13 Claims, 20 Drawing Sheets

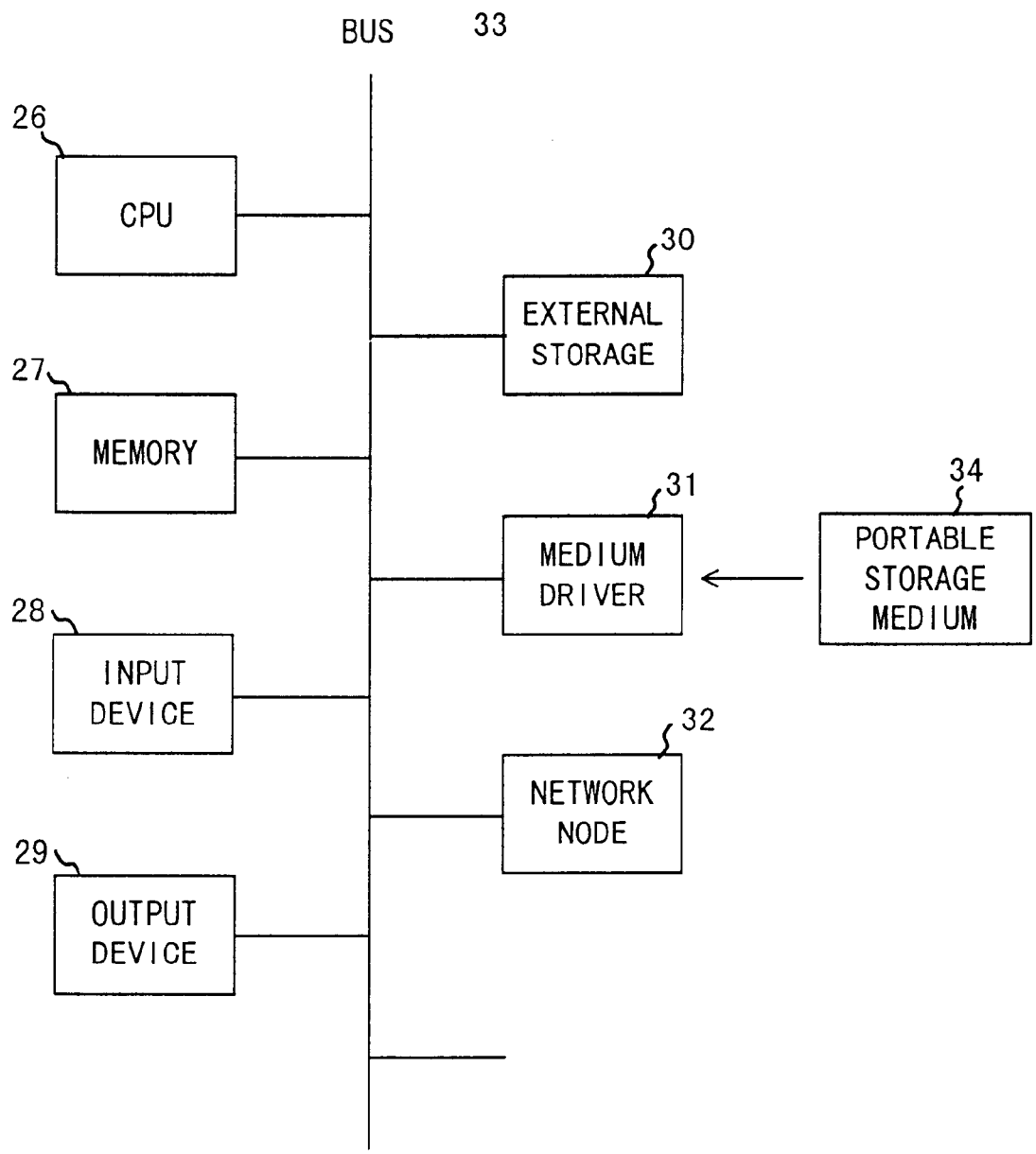
F I G. 2 A

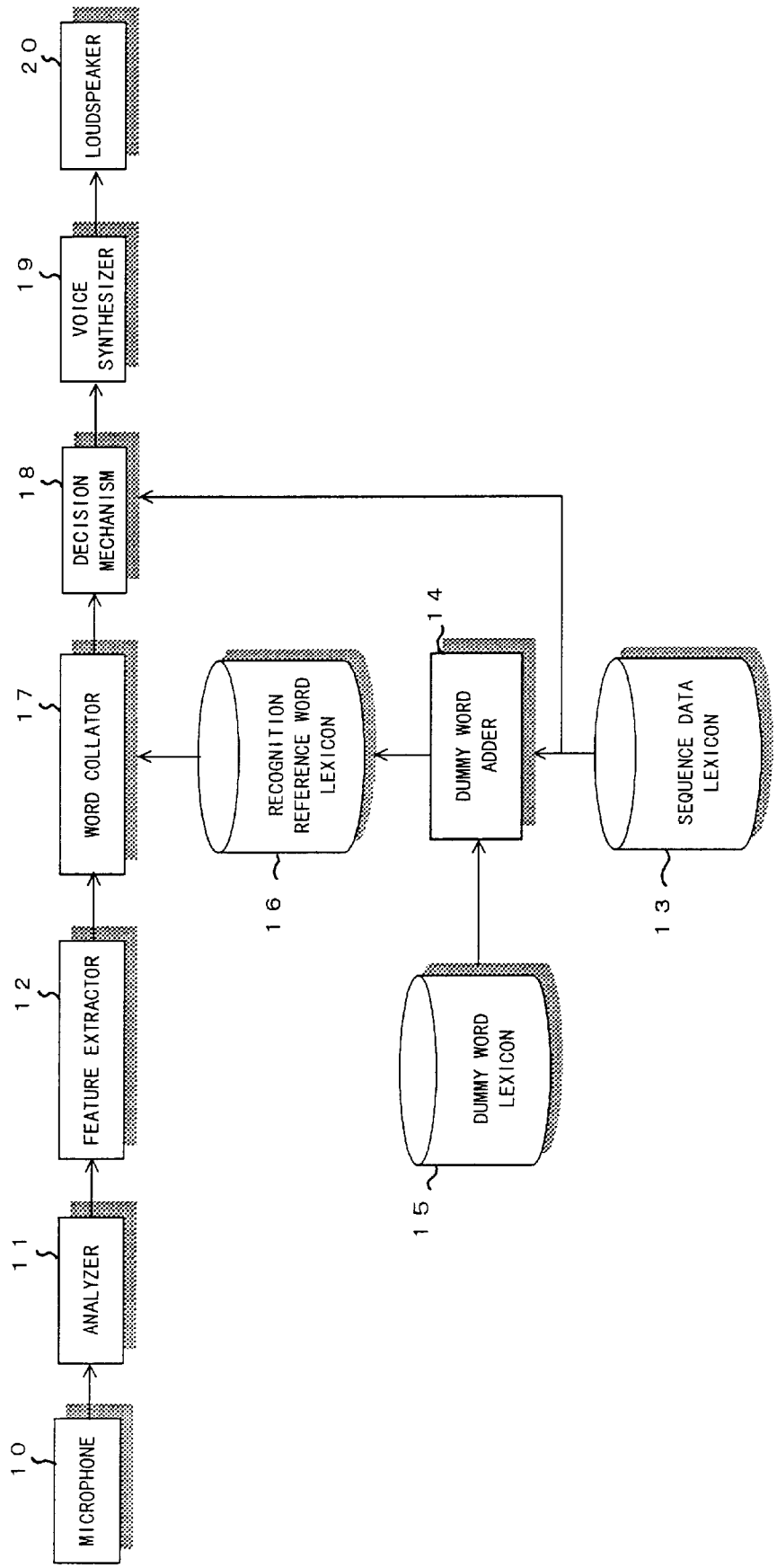
F I G. 3A

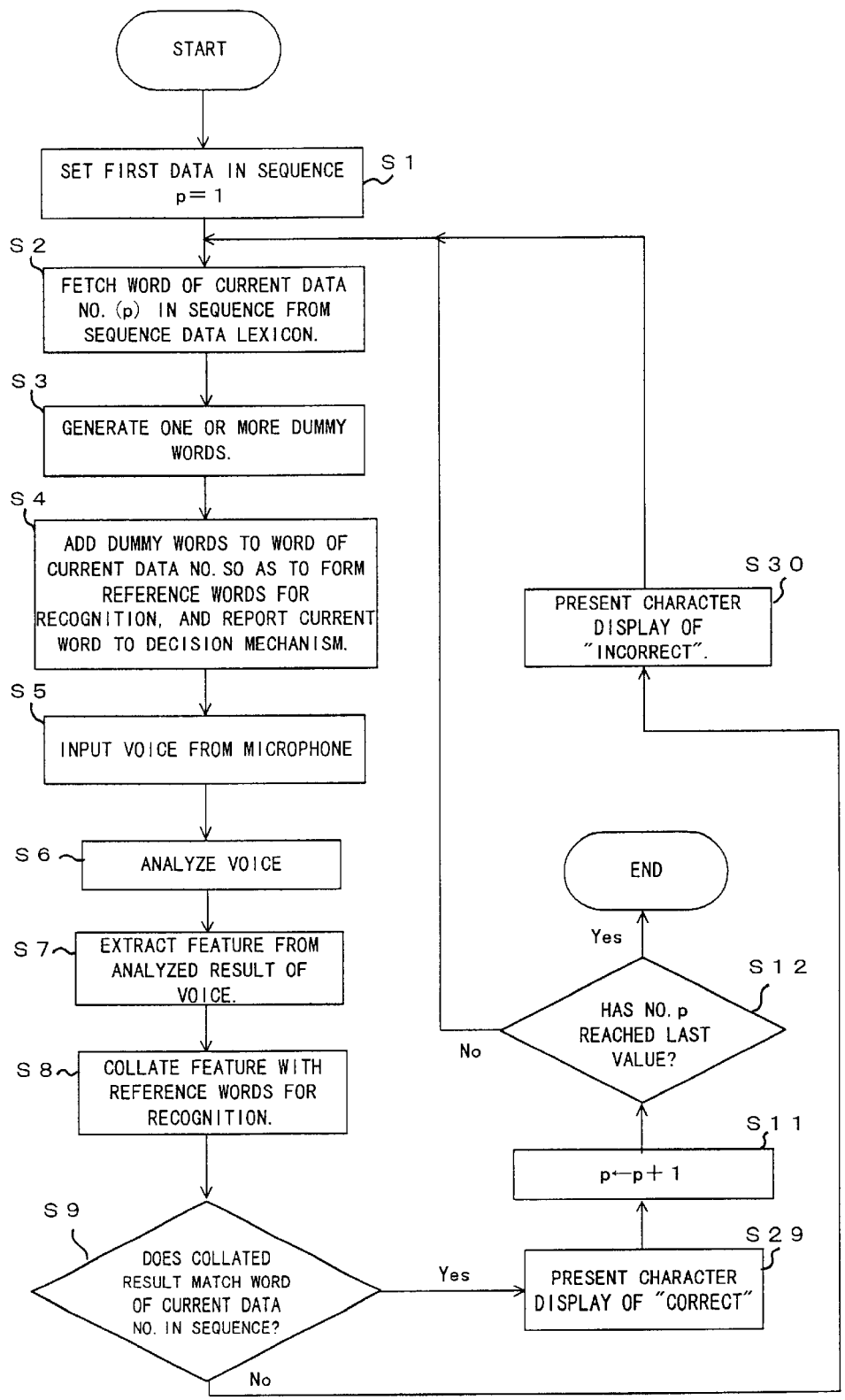
F I G. 4 B

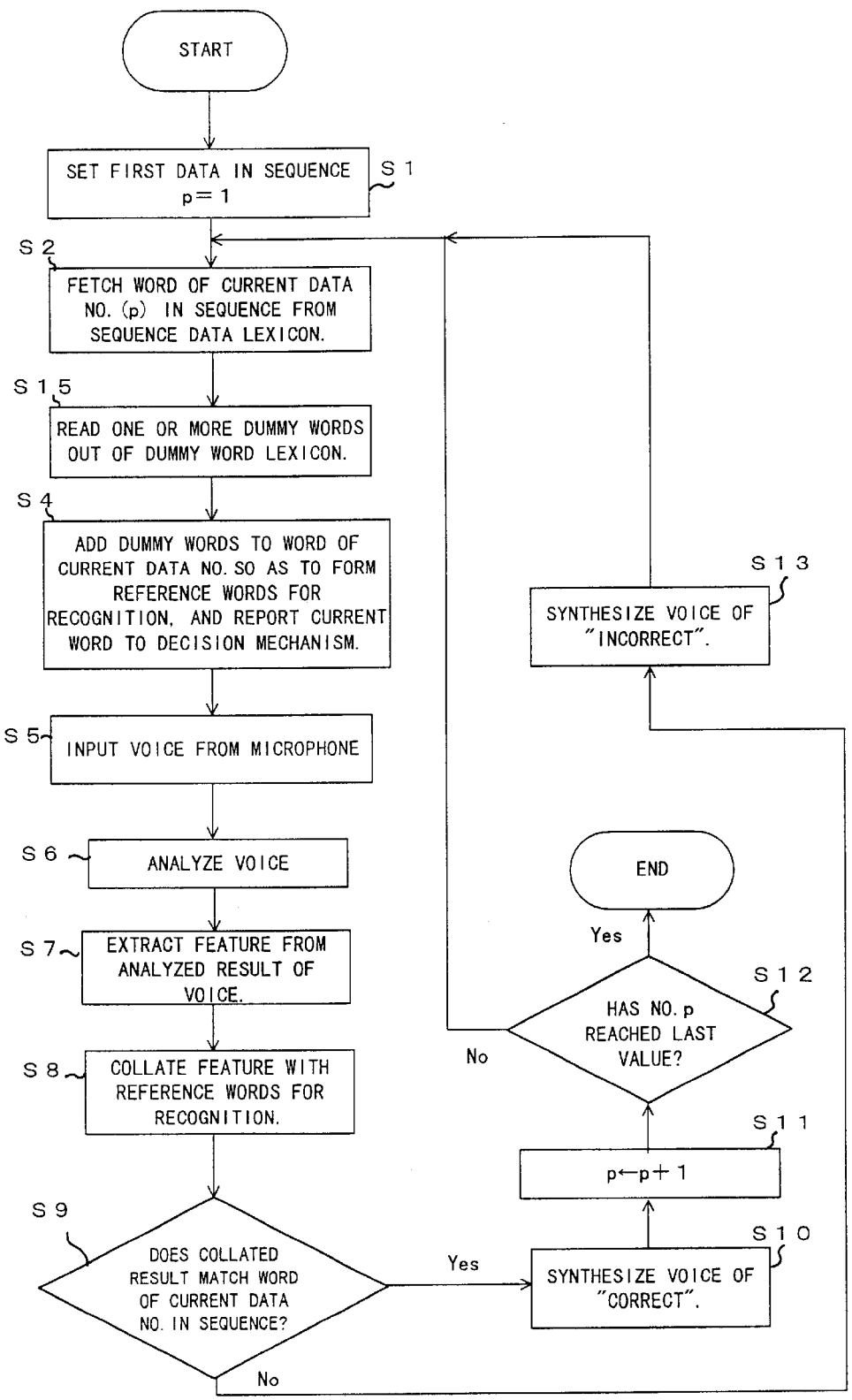
F I G. 5

| SEQUENCE DATA ITEM | DUMMY WORD #1 | DUMMY WORD #2 | DUMMY WORD #3 | ... |
|---|---|---|---|---|
| SHINJUKU | TOKYO | IKEBUKURO | SHIBUYA | ... |

F I G. 6 A

| SEQUENCE DATA ITEM | DUMMY WORD #1 | DUMMY WORD #2 | DUMMY WORD #3 | . . . |
|---|---|---|---|---|
| SHINJUKU | TOKYO | IKEBUKURO | SHIBUYA | . . . |
| YOYOGI | SHIN-OOKUBO | HARAJUKU | NAKANO | . . . |
| HARAJUKU | SHIBUYA | YOYOGI | SHINJUKU | . . . |
| . . . | . . . | . . . | . . . | |

F I G. 9

| i=1 | i=2 | i=3 | i=4 | i=5 | i=... |
|---|---|---|---|---|---|
| SHINJUKU | YOYOGI | HARAJUKU | SHIBUYA | EBISU | . . . |

FIG. 13

SPEECH RECOGNITION SYSTEM FOR SEQUENCE DATA

BACKGROUND OF THE INVENTION

1. Field of the Invention

The present invention relates to a system for recognizing voices. More particularly, it relates to a speech recognition system for recognizing the voices of sequence data, for example, the names of stations, which ought to be inputted in regular order.

2. Description of the Related Art

A "speech recognition system for sequence data" is an apparatus which recognizes whether or not sequent words, for example, the names of the stations of the Yamanote Loop Line or the names of successive emperors, are uttered properly in regular order. The apparatus is considered to be chiefly applicable to game machines and training machines by way of example. There is not any prior-art example of the speech recognition system of the specified type. Considered as the simplest method of realizing such a system is a speech recognition method wherein the names of the stations of the Yamanote Loop Line, for example, are all employed as reference or subject words for speech recognition, and wherein voice data currently inputted is compared with all the reference words for recognition.

Such a method, however, has the problem that, since the number of the reference words for recognition is large, a long time is expended on the speech recognition. Another problem is that, when similar words, for example, "Meguro" and "Mejiro" exist within the sequence data, misrecognition is liable to occur.

SUMMARY OF THE INVENTION

An object of the present invention is to provide a speech recognition system for sequence data as shortens a time period required for recognition and as reduces the errors of the recognition.

A speech recognition system according to the present invention comprises a recognition-reference-word generation unit, a speech recognition unit, a dummied-sequence-data storage unit (namely, a storage unit for sequence data accompanied with dummy data), and a recognition-reference-word storage unit.

In the first aspect of the present invention, the recognition-reference-word generation unit adds at least one dummy data item to a sequence data item which is to be currently inputted in predetermined order, thereby to form a set of reference words for speech recognition. The speech recognition unit delivers the reference word which is the most similar to an externally inputted voice in the set of recognition reference words, as a recognized result on the basis of the feature of the input voice.

In the second aspect of the present invention, the dummied-sequence-data storage unit stores therein data items which have been obtained by adding at least one dummy data item to each sequence data item. The speech recognition unit reads out the sequence data item to be currently inputted in predetermined order, as well as the dummy data item or items corresponding to this sequence data item, from the dummied-sequence-data storage unit, thereby to form a set of reference words for speech recognition, and it delivers the reference word being the most similar to an externally inputted voice in the set of recognition reference words, as a recognized result on the basis of the feature of the input voice.

In the third aspect of the present invention, the recognition-reference-word storage unit stores all sequence data items as reference words for speech recognition therein. The speech recognition unit delivers the reference word which is the most similar to an externally inputted voice among the recognition reference words, as a recognized result on the basis of the feature of the input voice.

BRIEF DESCRIPTION OF THE DRAWINGS

FIG. 2A is a connection diagram showing an example of arrangement of an information processing equipment;

FIG. 3A is a block diagram showing an architecture in the first aspect of performance of a speech recognition system for sequence data;

FIG. 4B is a flow chart showing another general process in the first aspect of performance;

FIG. 5 is a flow chart showing still another general process in the first aspect of performance;

FIG. 6A is a data format diagram for explaining a practicable example of data items which are stored in a recognition reference word lexicon;

FIG. 9 is a data format diagram for explaining a practicable example of data items which are stored in a dummied sequence data lexicon depicted in FIG. 8;

FIG. 13 is a data format diagram for explaining a practicable example of data items which are stored in a sequence data lexicon depicted in FIG. 11;

DESCRIPTION OF THE PREFERRED EMBODIMENTS

Now, the aspects of performance of the present invention will be described in detail with reference to the drawings.

Figure 1A:
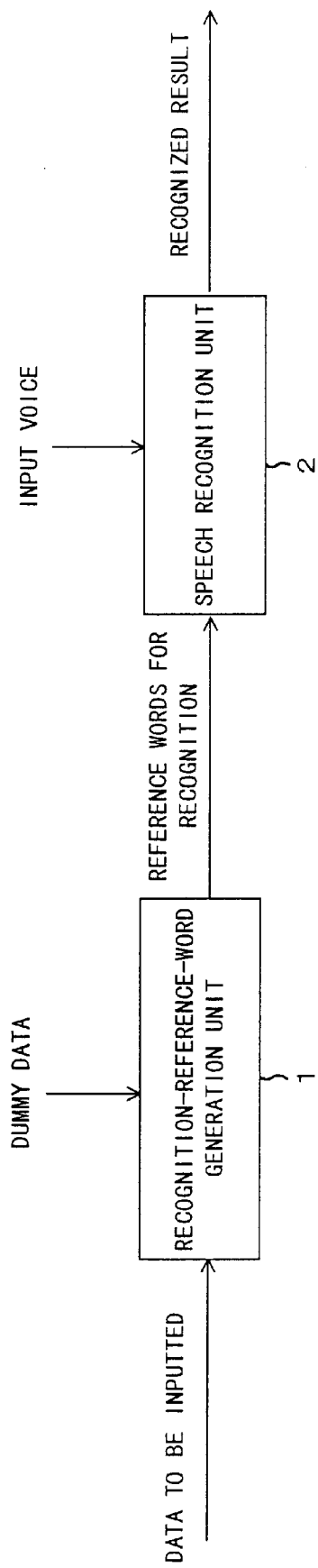
FIG. 1A is a block diagram showing the first fundamental construction of the present invention.
Figure 1B:
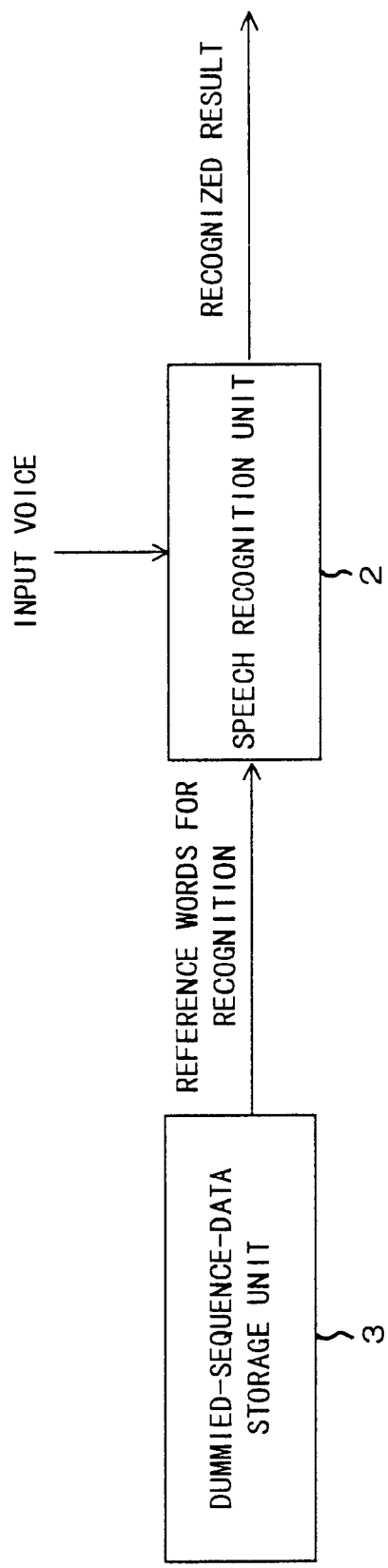
FIG. 1B is a block diagram showing the second fundamental construction of the present invention.

FIGS. 1A and 1B are block diagrams showing the fundamental constructions of the present invention, respectively. Each of these figures illustrates the fundamental construction of a speech recognition system for sequence data as recognizes the voices of the sequence data which ought to be inputted in regular order as predetermined.

FIG. 1A is a block diagram showing the first fundamental construction of the present invention. Referring to the figure, a recognition-reference-word generation unit 1 adds at least one item of dummy data to a sequence data item which ought to be currently inputted in predetermined order, thereby to generate a set of reference or subject words for speech recognition. A speech recognition unit 2 delivers the reference word which is the most similar to an externally inputted voice among the generated recognition reference words, as a recognized result on the basis of the feature of the input voice.

In the first fundamental construction of the present invention, the voice inputted from outside is subjected to, for example, an analysis and feature extraction, and the reference word which is the most similar to the input voice in the set of reference words for recognition, that is, in the set of reference words obtained by adding one or more dummy data items to the sequence data item to-be-currently-inputted, is outputted as the recognized result on the basis of the result of the feature extraction. Thus, in contrast to a case where all the sequence data items of a specified sequence are used as reference words for recognition, the present invention suffices with, at most, several reference words for recognition, so that a time period for recognition can be shortened and that the errors of the recognition can be reduced.

FIG. 1B is a block diagram showing the second fundamental construction of the present invention. Referring to the figure, a dummied-sequence-data storage unit 3 (namely, a storage unit 3 for sequence data accompanied with dummy data) stores therein data items which have been obtained by adding at least one item of dummy data to each sequence data item which ought to be inputted in predetermined order. Besides, a speech recognition unit 2 reads out the sequence data item to be currently inputted in the predetermined order, as well as the dummy data item or items corresponding to this sequence data item, from the dummied-sequence-data storage unit 3, thereby to form a set of reference or subject words for recognition, and it delivers the reference word being the most similar to an externally inputted voice among the recognition reference words, as a recognized result on the basis of the feature of the input voice.

The first and second fundamental constructions differ only in the following point: In the second fundamental construction, the dummied sequence data (namely, the sequence data accompanied with the dummy data) in which at least one dummy data item is added to each sequence data item are created beforehand, and the created data are prestored in the dummied-sequence-data storage unit 3, whereas in the first fundamental construction, the reference words for speech recognition in which at least one dummy data item is added to the sequence data item are generated at the time of inputting this sequence data item.

The aspect of performance of each of the first and second fundamental constructions may well be one further comprising a decision unit which collates the recognized result of the speech recognition unit 2 with the data item to be currently inputted in the predetermined order, and which decides whether or not they match. Besides, the dummy data item may well be a neighboring data item which lies in the neighborhood of the data item to-be-currently-inputted within the sequence data items. Further, it is also allowed to comprise a display unit, for example, as means for indicating or reporting those reference words for speech recognition in which at least one dummy data item is added to the data item to-be-currently-inputted.

FIG. 2A is a connection diagram showing an example of arrangement of an information processing equipment which is a speech recognition system according to the present invention. The information processing equipment shown in FIG. 2A comprises a CPU (central processing unit) 26, a memory 27, an input device 28, an output device 29, an external storage 30, a medium driver 31 and a network node 32, which are interconnected by a bus 33.

The CPU 26 runs programs stored in the memory 27, and controls the constituents of the equipment. The memory 27 is, for example, a ROM (read only memory) or a RAM (random access memory), in which the programs are stored. The input device 28 includes a keyboard, a mouse, a microphone or/and the like, to which various kinds of data are inputted. The output device 29 includes a printer, a display device, a loudspeaker or/and the like, from which various kinds of data are outputted. The external storage 30 is, for example, a hard disk device, in which programs and data can be stored in large quantities. The medium driver 31 can drive a portable storage medium 34 so as to access the stored contents thereof. The portable storage medium 34 is a memory card, a floppy disk, a CD-ROM (compact-disk read only memory), an optical disk, or the like. The network node 32 can be connected with a LAN (local area network) or the like so as to exchange data with any other information processing equipment or the like.

Figure 2B:
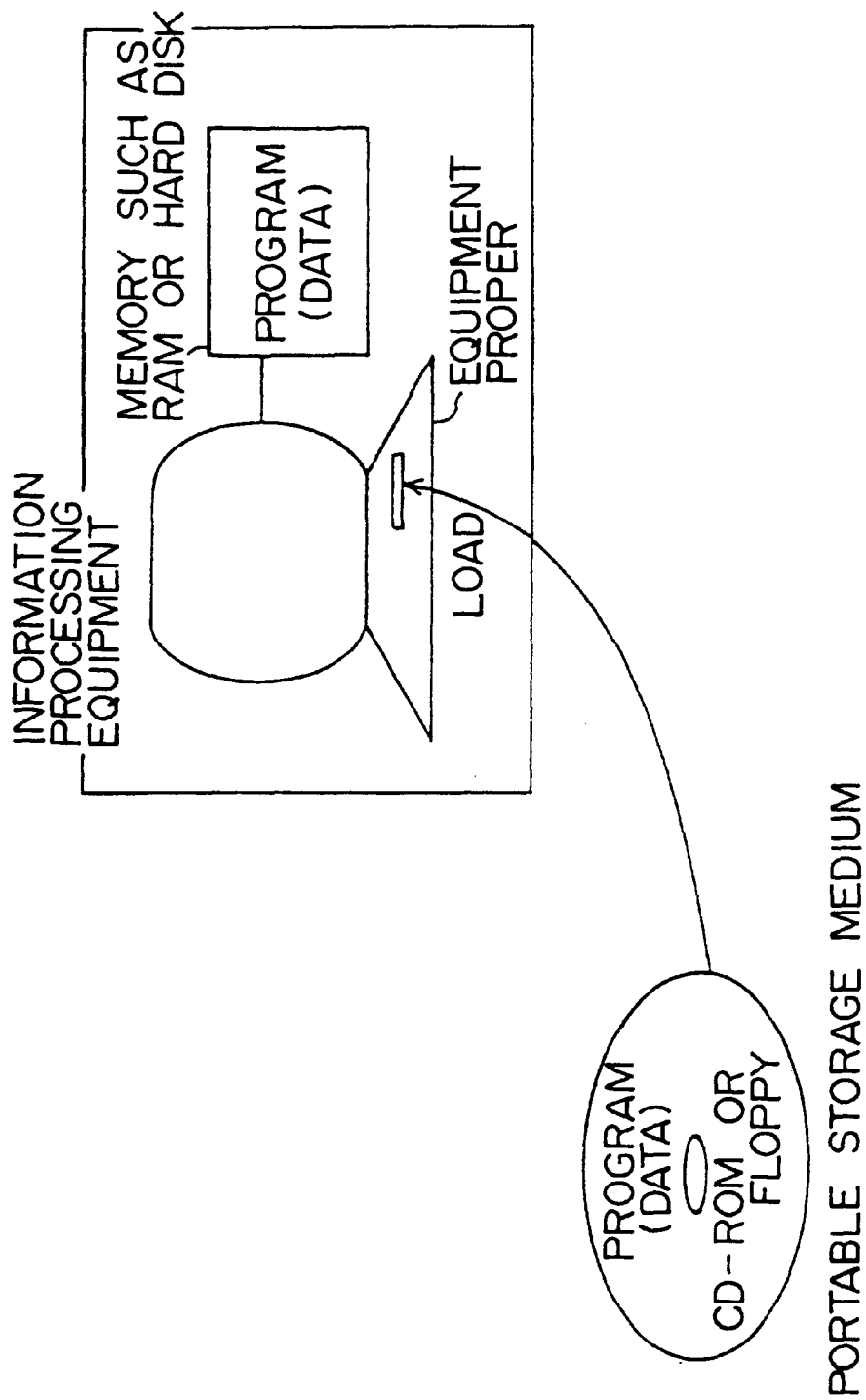
FIG. 2B is a schematic diagram for explaining an information processing equipment into which a portable storage medium can be loaded.

FIG. 2B is a schematic diagram for explaining an information processing equipment into which a portable storage medium can be loaded. Programs and data stored in the portable storage medium can be utilized by loading the information processing equipment with the memory card, floppy disk, CD-ROM, optical disk or the like as mentioned above.

Meanwhile, the present invention can also construct a computer-readable storage medium storing therein a program for causing a computer to execute a first procedure for adding at least one item of dummy data to a sequence data item which ought to be currently inputted in predetermined order, thereby to form recognition reference words for speech recognition; and a second procedure for outputting the recognition reference word which is the most similar to an externally inputted voice among the recognition reference words, as a recognized result on the basis of a feature of the input voice.

Further, the present invention can construct a computer-readable storage medium storing therein a program for causing a computer to execute a procedure for reading out of a dummied-sequence-data storage unit which stores therein data items obtained by adding at least one item of dummy data to each sequence data item, the sequence data item which is to be currently inputted in predetermined order, as well as at least one dummy data item which corresponds to this sequence data item, thereby to form recognition reference words for speech recognition, and for outputting the reference word which is the most similar to an externally inputted voice among the recognition reference words, as a recognized result on the basis of a feature of the input voice.

Still further, the present invention can construct a computer-readable storage medium storing therein a program for causing a computer to execute a first procedure for storing all sequence data items as recognition reference words for speech recognition; and a second procedure for outputting the recognition reference word which is the most similar to an externally inputted voice among the recognition reference words, as a recognized result on the basis of a feature of the input voice.

As described above, according to the present invention, the reference or subject words for speech recognition can be limited to, at most, several words obtained by adding one or more dummy data items to the sequence data item which ought to be currently inputted.

FIG. 3A is a block diagram showing an architecture in the first aspect of performance of a speech recognition system for sequence data according to the present invention. Referring to the figure, the speech recognition system comprises a microphone 10 to which a voice is inputted, an analyzer 11 which analyzes the inputted voice, a feature extractor 12 which extracts the feature of the input voice from the analyzed result of this voice obtained by the analyzer 11, a sequence data lexicon 13 in which sequence data are stored, a dummy word adder 14 which adds at least one dummy word to each of the sequence data successively read out in word units in regular order from the sequence data lexicon 13, thereby to form a set of words for recognition, a dummy word lexicon 15 in which any desired dummy words are prestored in a large number, a recognition reference word lexicon 16 in which the outputs of the dummy word adder 14 are stored, a word collator 17 which makes the comparisons between the stored contents of the recognition reference word lexicon 16 and the feature of the input voice extracted by the feature extractor 12 and which outputs the recognition reference word being the most similar to the feature of the input voice, a decision mechanism 18 which decides the match between the output of the word collator 17 and the sequence data item to-be-currently-inputted as is delivered from the sequence data lexicon 13, a voice synthesizer 19 which synthesizes the voice of the decided result of the decision mechanism 18, and a loudspeaker 20 which produces the synthesized result of the voice synthesizer 19 as a voice output.

Figure 3B:
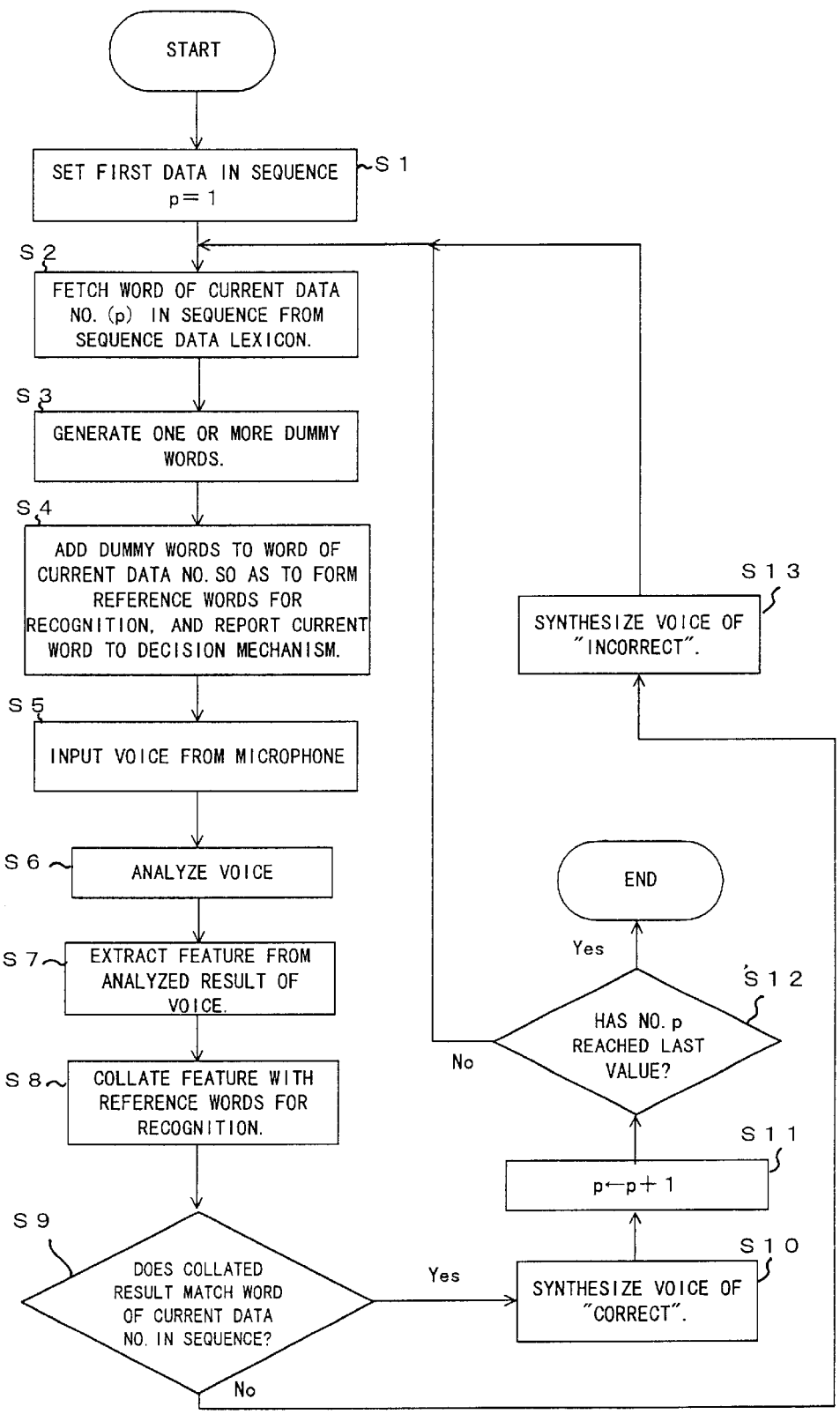
FIG. 3B is a flow chart showing a general process in the first aspect of performance.

FIG. 3B is a flow chart showing a general process in the first aspect of performance of the speech recognition system for sequence data as depicted in FIG. 3A. Referring to FIG. 3B, when the process is started, the value of a variable p which indicates the number of order in a specified sequence is set to "1" at step S1 in order to fetch a first sequence data item. Thereafter, at step S2, the word of the current order or data number (p), here the first word, is fetched from the sequence data lexicon 13. At step S3, n dummy words are generated (n being any desired integral number of at least one). At step S4, the dummy words are added to the word being the sequence data item of the current order or data number, thereby to form a set of reference words for recognition, and the current sequence data item is reported to the decision mechanism 18.

Subsequently, a voice which is inputted from outside is received by the microphone 10 at step S5. At step S6, the input voice is analyzed by the analyzer 11. Besides, at step S7, the feature of the input voice is extracted from the analyzed result thereof by the feature extractor 12. Next, at step S8, the word collator 17 operates to collate the extracted feature with the recognition reference words, and to derive the recognition reference word closest to the feature. Further, at step S9, the decision mechanism 18 decides whether or not the collated result matches the word of the current order or data number Subject to the decision of the decision mechanism 18 that the collated result matches the word of the current order, namely, the sequence data item to be inputted, the voice of "Correct" is synthesized by the voice synthesizer 19 at step S10. Thereafter, the value of the variable p is incremented at step S11. The subsequent step S12 serves to decide whether or not the number p indicative of the order in the specified sequence has reached the last order. In a case where the last order has not been reached yet, the flow of the process returns to step S2, at which the sequence data item of the next order or data number is fetched so as to iterate the processing of step S3 et seq. On the other hand, subject to the decision of the decision mechanism 18 at step S9 that the collated result does not match the sequence data item to be currently inputted, the voice of "Incorrect" is synthesized by the voice synthesizer 19 at step S13, and the processing of step S2 et seq. is iterated. Besides, the process is ended when it has been decided at step S12 that the variable p indicative of the number of the sequence data item has reached the last order.

Incidentally, although the above process has been described as synthesizing the voices "Correct" and "Incorrect" by the voice synthesizer 19 at the respective steps S10 and S13, only either the voice "Correct" or the voice "Incorrect" may well be synthesized. In a case, for example, where only the voice "Correct" is synthesized by the voice synthesizer 19 without synthesizing the voice "Incorrect", the decision "Incorrect" can be understood from the synthesis of no voice.

Figure 4A:
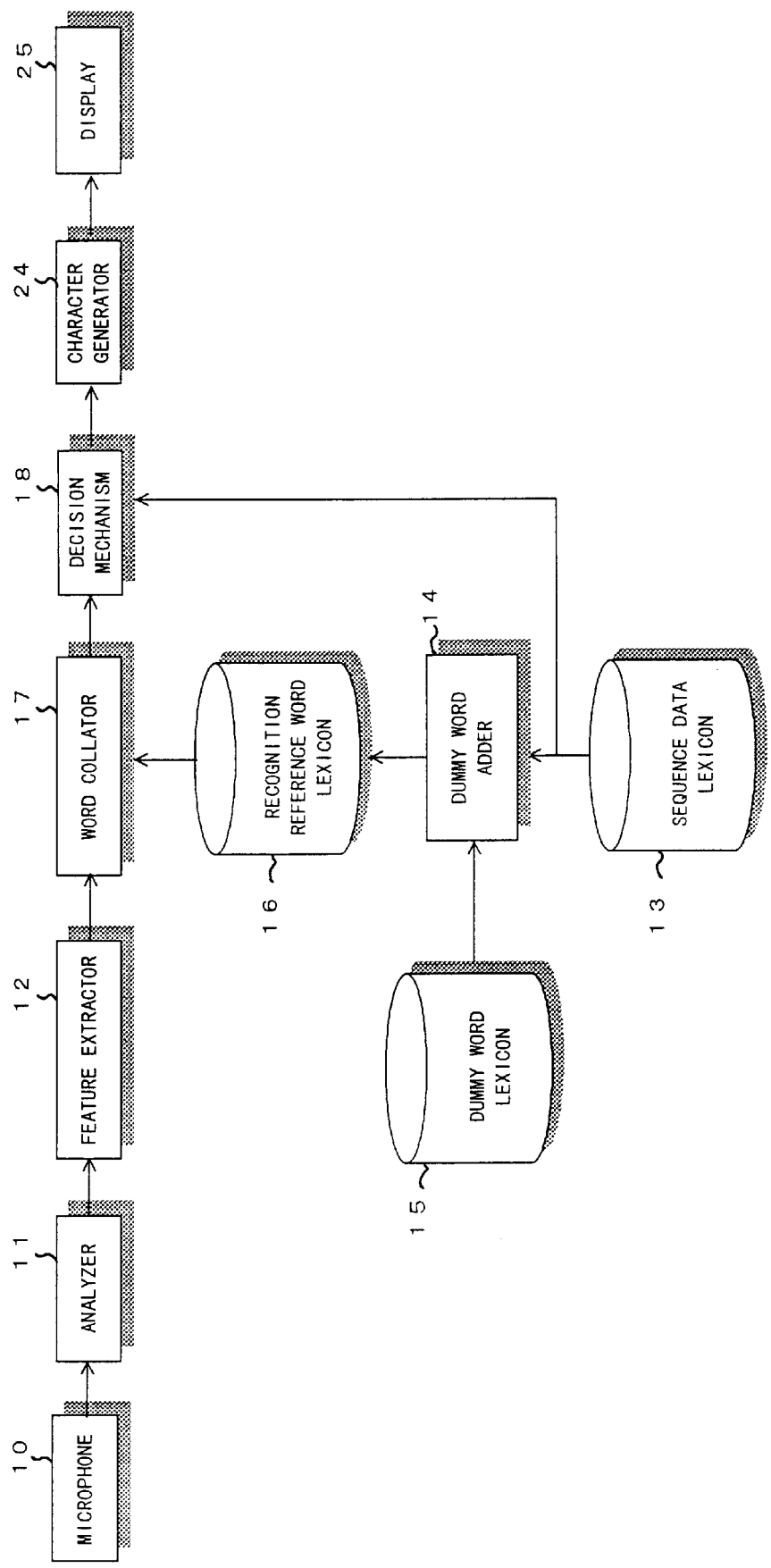
FIG. 4A is a block diagram showing another architecture in the first aspect of performance of the speech recognition system for sequence data.

Further, the voice "Correct" or "Incorrect" synthesized by the voice synthesizer 19 may well be emitted by the loudspeaker 20. FIG. 4A is a block diagram showing an architecture which is partly different from the architecture in the first aspect of performance of the speech recognition system for sequence data as depicted in FIG. 3A. In the architecture of FIG. 4A, a character generator 24 is mounted instead of the voice synthesizer 19 shown in FIG. 3A, and a display device 25 instead of the loudspeaker 20. The character generator 24 receives the result decided by the decision mechanism 18, and it generates characters "Correct" or "Incorrect" so as to display them on the display device 25.

FIG. 4B is a flow chart showing a general process in the first aspect of performance of the speech recognition system for sequence data as depicted in FIG. 4A, and it is partly different from the flow chart illustrated in FIG. 3B. In the general process of FIG. 4B, the processing of presenting the character display "Correct" is executed at step S29 instead of the processing of synthesizing the voice "Correct" at step S10 shown in FIG. 3B, and the processing of presenting the character display "Incorrect" is executed at step S30 instead of the processing of synthesizing the voice "Incorrect" at step S13.

FIG. 5 is a flow chart showing a general process in the first aspect of performance of the speech recognition system for sequence data as depicted in FIG. 3A, the general process being partly different from that illustrated in FIG. 3B. As compared with the flow chart illustrated in FIG. 3B, the flow chart illustrated in FIG. 5 is such that the processing of generating the dummy words at step S3 shown in FIG. 3B is replaced with the processing of reading n dummy words (n being any desired integral number of at least one) out of the dummy word lexicon 15 at step S15. More specifically, the dummy word lexicon 15 is included in the architecture of FIG. 3A, and it is accordingly considered reasonable to read the dummy words out of the dummy word lexicon 15 as indicated at step S15. In the general process of FIG. 3B, however, the dummy word adder 14 generates the new dummy words for the pth sequence data item at step S3 in order to cope with a situation where the dummy word lexicon 15 is not mounted. Incidentally, the number of the dummy words which are generated at step S3 is not always equal to that of the dummy words which are read out at step S15.

Figure 6B:
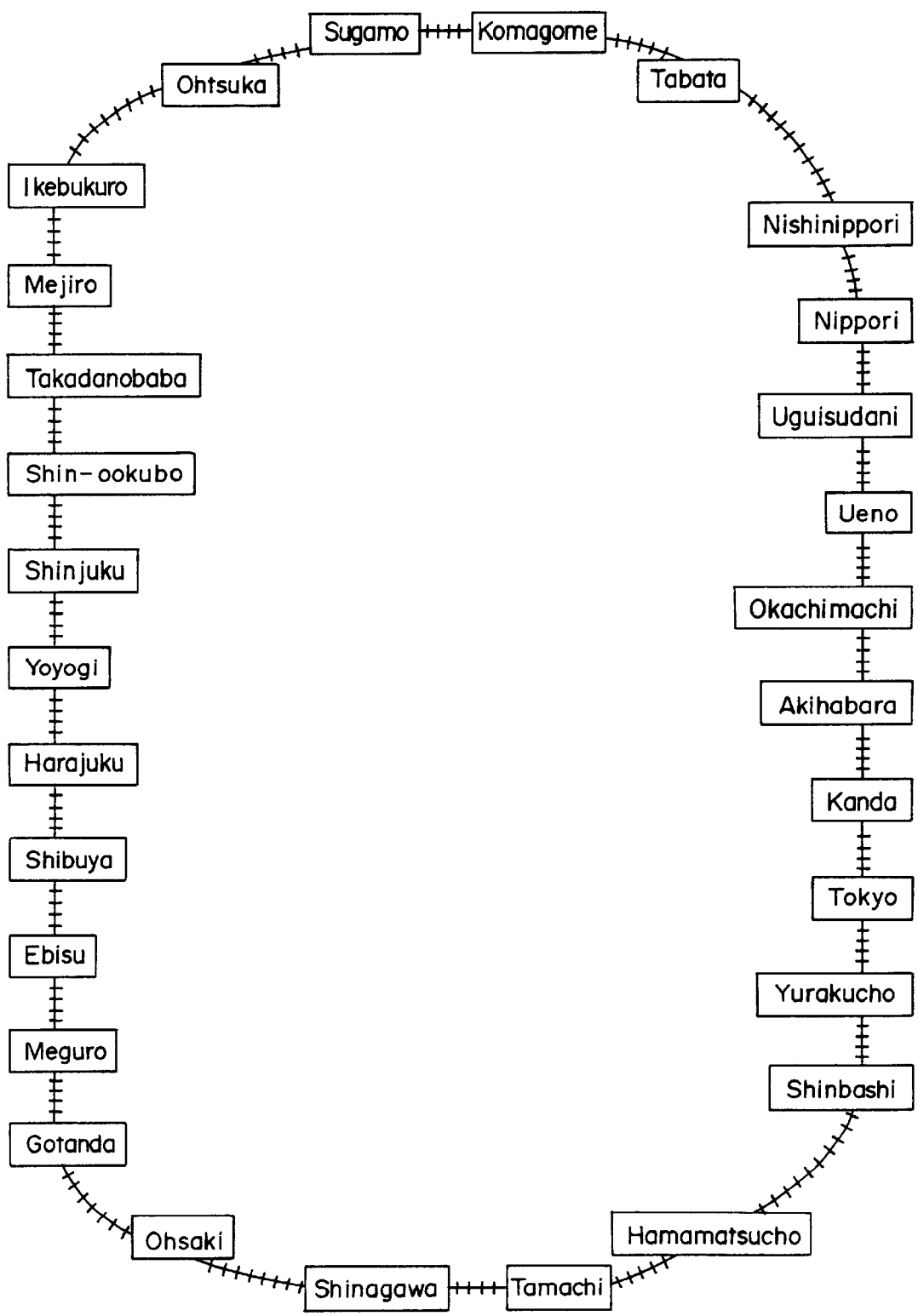
FIG. 6B is a route diagram of the Yamanote Loop Line the names of the stations of which are practicable examples of sequence data and dummy words.

FIG. 6A is a data format diagram for explaining a practicable example of data items which are stored in the recognition reference word lexicon 16 depicted in FIG. 3A. Besides, FIG. 6B is a route diagram of the Yamanote Loop Line for explaining the names of the stations thereof as exemplify the above data. Referring to FIG. 6A, in addition to the correct sequence data item "Shinjuku" which ought to be currently inputted, the names of the stations "Tokyo", "Ikebukuro" and "Shibuya" are stored as three dummy words in the recognition reference word lexicon 16. The sequence data item and the dummy words are afforded to the word collator 17 shown in FIG. 3A, as one set of reference words for recognition. Here, the sequence data are assumed the names of the stations of the Yamanote Loop Line as are arrayed in succession. The names "Tokyo", "Ikebukuro" and "Shibuya" are usable as the dummy words by reason that they neither succeed the sequence data item "Shinjuku" in the correct order within the order of the sequence data items of the specified sequence, nor precede the same "Shinjuku". Although the three dummy words have been mentioned above, the number of dummy words may be any of at least one.

As described in detail above, according to the present invention, at least one item of dummy data is added to a sequence data item to-be-currently-inputted, thereby to form reference or subject words for speech recognition, whereby a time period required for recognition can be shortened, and the errors of the recognition can be reduced.

Whether or not any of the reference words for recognition has matched an input voice, is collated, whereby whether or not the input voice is the word of the current order can be decided. In case of affording the result of the collation as a voice output or a character display, whether or not any reference word and the input voice have matched can be understood.

Figure 7:
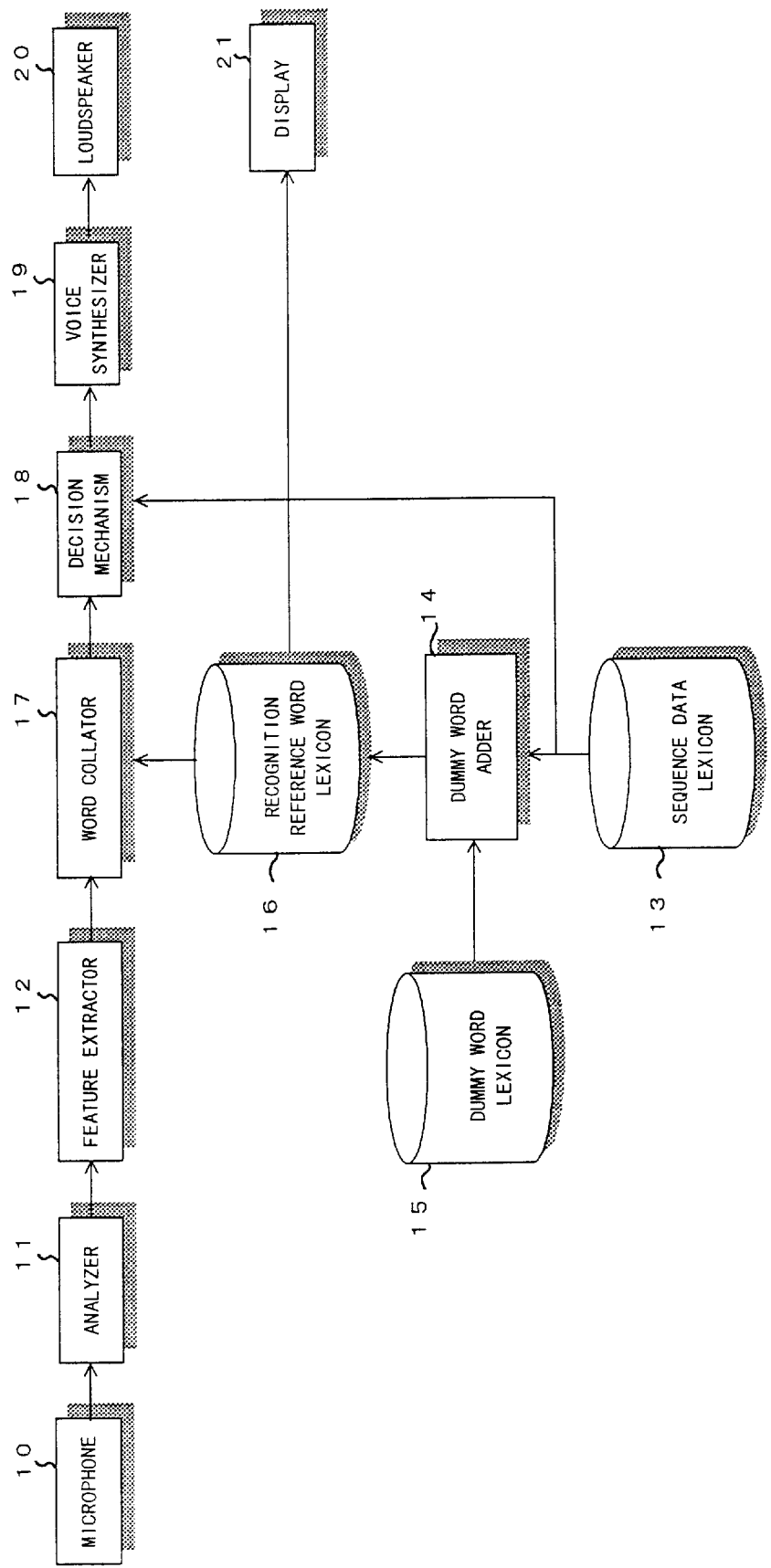
FIG. 7 is a block diagram showing an architecture in the second aspect of performance of a speech recognition system for sequence data.

FIG. 7 is a block diagram showing an architecture in the second aspect of performance of a speech recognition system for sequence data. As compared with the first aspect of performance illustrated in FIG. 3A, the second aspect of performance differs only in the point of comprising a display device 21 which displays the reference or subject words for speech recognition as stored in the recognition reference word lexicon 16. In the case where the stored contents of the recognition reference word lexicon 16, namely, the reference words for speech recognition are displayed on the display device 21, the user of the speech recognition system can utilize the displayed contents as a help screen, and he/she is facilitated to input only one correct sequence data item existing in the displayed set of the subjects for speech recognition.

In a case where the reference words for speech recognition as generated are displayed on a display device, a user can be assisted in inputting a correct sequence data item, and this contributes greatly to enhancement in the practicability of a speech recognition system for sequence data.

Figure 8:
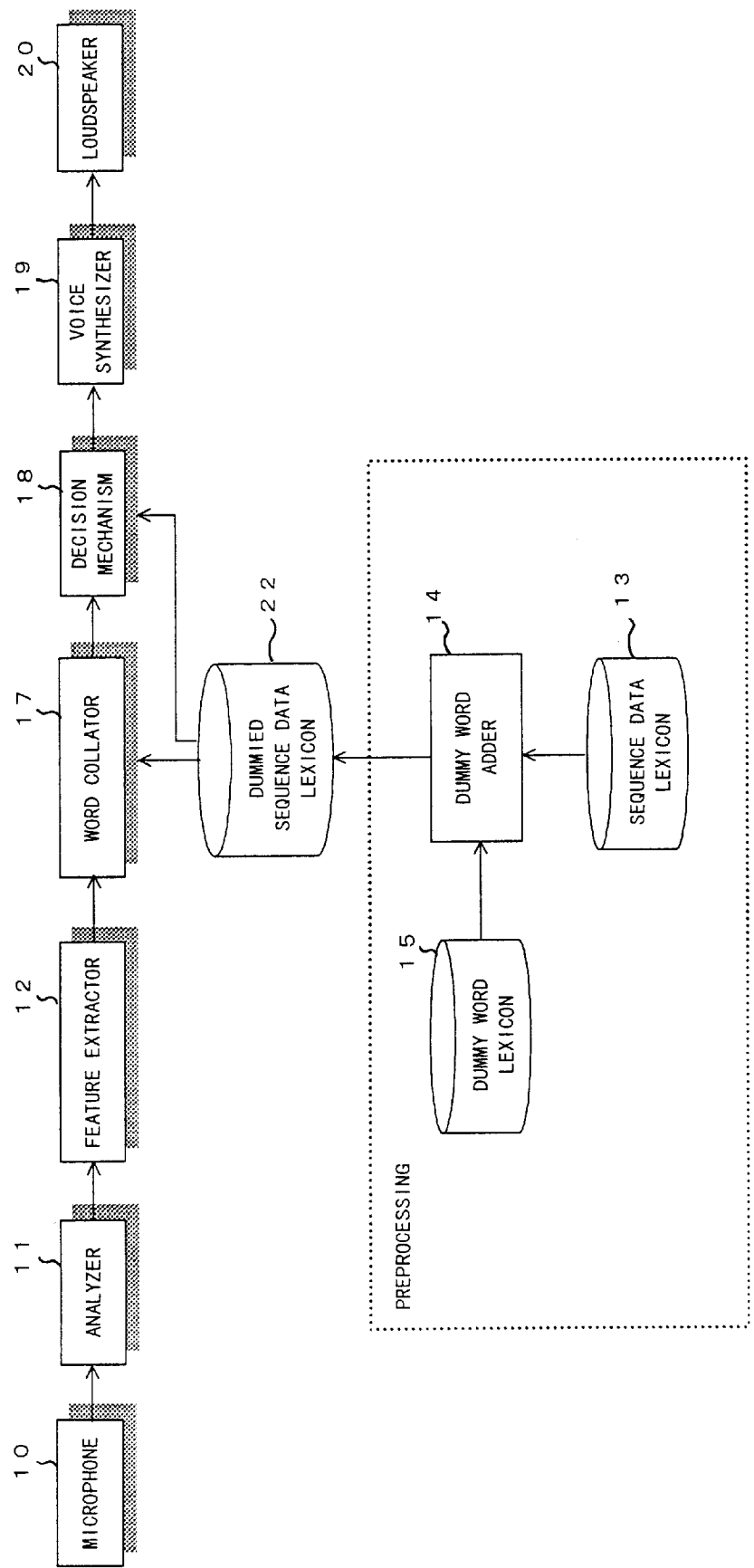
FIG. 8 is a block diagram showing an architecture in the third aspect of performance of a speech recognition system for sequence data.

FIG. 8 is a block diagram showing an architecture in the third aspect of performance of a speech recognition system for sequence data. As compared with the first aspect of performance illustrated in FIG. 3A, the third aspect of performance differs in the point that a dummied sequence data lexicon 22 (namely, a lexicon 22 for sequence data accompanied with dummy words) is mounted instead of the recognition reference word lexicon 16. For the dummied sequence data lexicon 22, contents to be stored therein are created in preprocessing which precedes the speech recognition of sequence data in, for example, a game machine. More specifically, in the preprocessing, at least one dummy word stored in the dummy word lexicon 15 is added by the dummy word adder 14 to each of the sequence data or words which are successively read out of the sequence data lexicon 13 one by one, and the resulting words are stored as dummied sequence data in the dummied sequence data lexicon 22. By the way, in the decision of the decision mechanism 18 for the output of the word collator 17, the correct sequence data item is given by the dummied sequence data lexicon 22.

Here will be explained the collating function of the word collator 17 and the deciding function of the decision mechanism 18. These functions are common to all the aspects of performance of the present invention. The word collator 17 calculates the distance between the pattern of the voice which is inputted in the speech recognition and a template which is each of the recognition reference words stored in the recognition reference word lexicon 16. In general, so-called "identification" is very difficult of realization in speech recognition wherein, when the value of the distance is smaller than a certain threshold value, the input pattern is collated as belonging to the same category as that of the template. The reason therefor is that, not only discrepancy based on the disagreement of the categories, but also various other factors such as discrepancy in speakers, discrepancy in noise environments and discrepancy in microphones are involved in the distance between the input pattern and the template. Accordingly, even when the distance exceeds the certain threshold value, it cannot be positively stated that the categories of the input pattern and the template are quite different. Even in the same category, the distance sometimes becomes long due to the discrepant speakers.

A discriminating operation is therefore performed by preparing two or more templates, calculating the distances between the input pattern and the respective templates, and obtaining that category of the template which minimizes the distance relative to the category of the input pattern. In the discrimination, the discrepancies in speakers, noise environments, microphones etc. are equally reflected in the distances between the input pattern and all the templates, so that the correct category can be found without being affected by the discrepancies. In a case where the identification is done using the discrimination, the input pattern is collated by employing the template of at least one dummy category besides the template of the category desired to be identified. The identification shall be decided to have succeeded on condition that the category desired to be identified has been discriminated, whereas it shall be decided to have failed on condition that any other category has been discriminated.

Eventually, the collation which proceeds with the correct sequence data item and one or more dummy data items in the word collator 17 is the discriminating operation. Moreover, the decision of the decision mechanism 18 as to whether or not the output of the word collator 17 being the result of the collation matches the correct sequence data item indicates the success or failure of the identification.

FIG. 9 illustrates a practicable example of data which are stored in the dummied sequence data lexicon 22 depicted in FIG. 8. In the example of FIG. 9, the sequence data are the names of the stations of the Yamanote Loop Line mentioned before. As the sequence data, the name "Yoyogi" is stored following the name "Shinjuku", and the name "Harajuku" following the name "Yoyogi". Besides, three dummy words are stored for each item of the sequence data. The stored data have been created by the preprocessing.

Incidentally, the number of the dummy words need not be three for each sequence data item.

Moreover, the dummy words -to-be-stored which are created by the preprocessing are read out of the dummy word lexicon 15 in which any desired dummy words are stored, so that the name "Nakano" of a station which is not the station of the Yamanote Loop Line is also contained.

Figure 10:
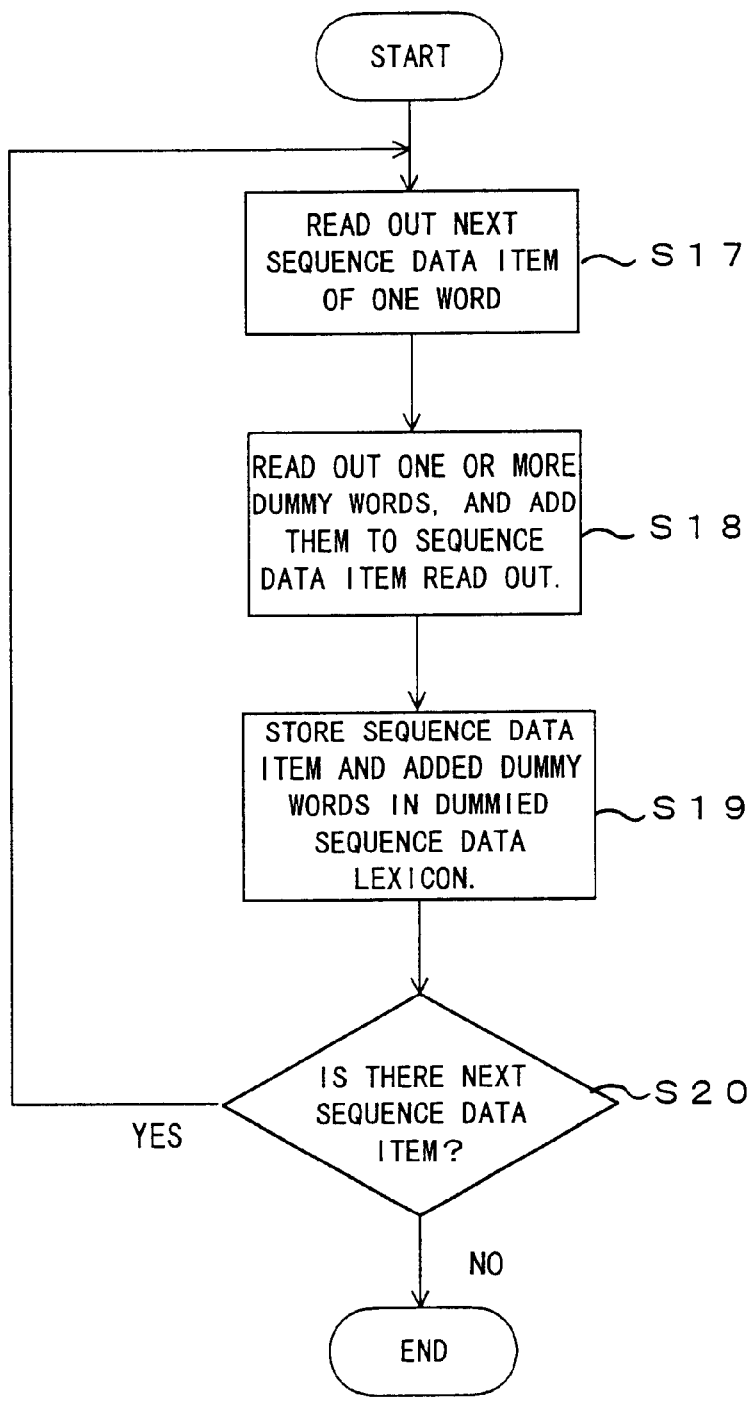
FIG. 10 is a flow chart showing a process which is executed by a dummy word adder depicted in FIG. 8.

FIG. 10 is a flow chart showing a process for generating dummied sequence data (namely, sequence data accompanied with dummy words). Referring to the figure, when the process is started, the next sequence data item of one word is read out of the sequence data lexicon 13 at step S17. At step S18, n dummy words (n being any integral number of at least one) are read out of the dummy word lexicon 15 and are added to the sequence data item read out at step S17. The sequence data item and the dummy words are stored in the dummied sequence data lexicon 22 at step S19. Step S20 serves to decide whether or not the next sequence data item exists in the sequence data lexicon 13. In the absence of the next sequence data item, the data generation process is ended. On the other hand, in the presence of the next sequence data item, the processing of step S17 et seq. is iterated in order to generate the dummied sequence data for the next sequence data item.

Sequence data with dummy data added thereto are prestored and are read out to form reference words for recognition, whereby a time period required for the recognition can be made still shorter.

A plurality of templates as reference words for recognition are employed at the time of a collation, whereby discrepancies in speakers, noise environments, microphones etc. can be corrected to heighten the identification precision of the collation and to enhance the reliability of a decision.

Figure 11:
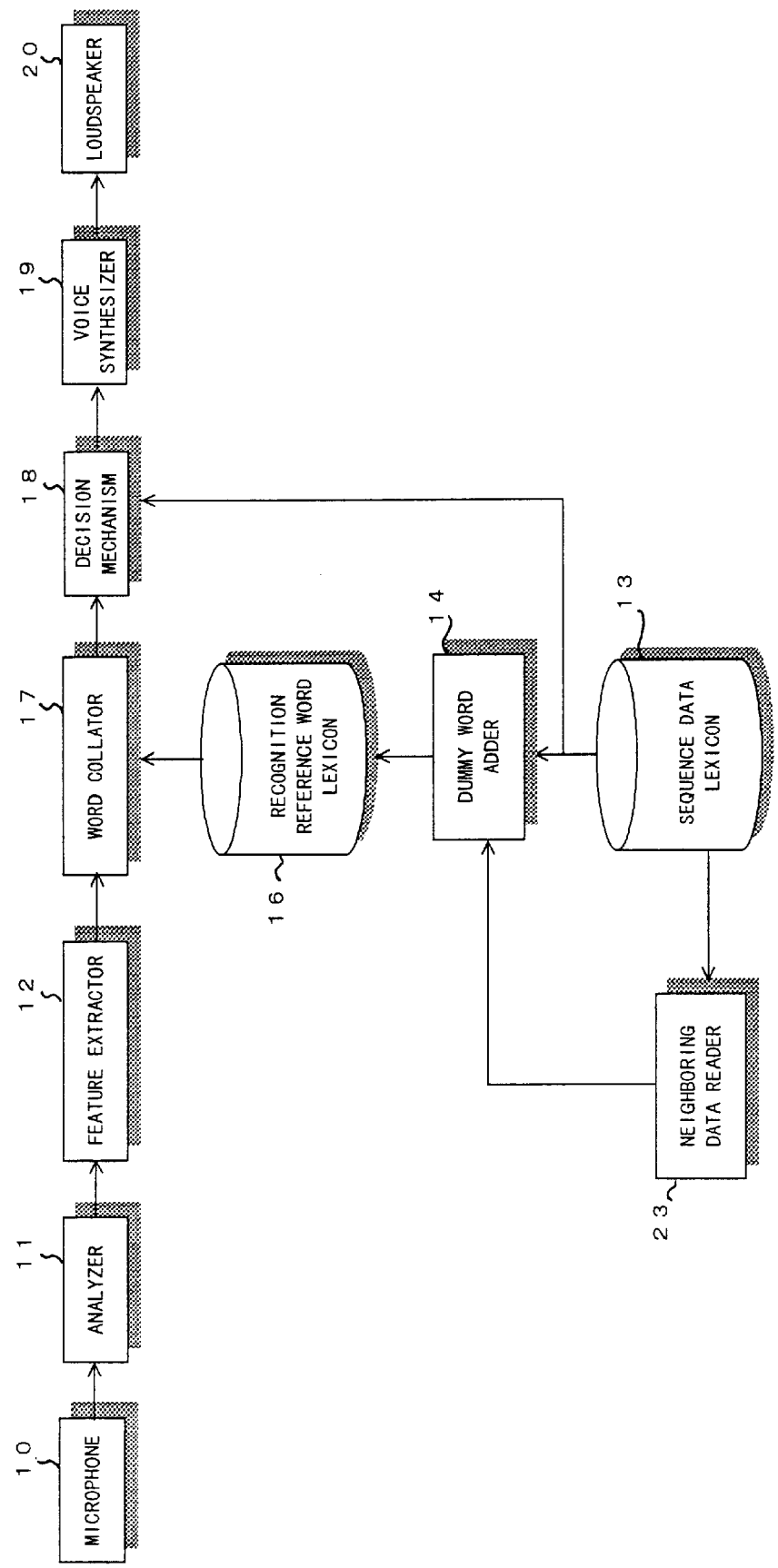
FIG. 11 is a block diagram showing an architecture in the fourth aspect of performance of a speech recognition system for sequence data.

FIG. 11 is a block diagram showing an architecture in the fourth aspect of performance of a speech recognition system for sequence data. As compared with the first aspect of performance illustrated in, for example, FIG. 3A, the fourth aspect of performance differs in the point that the dummy word lexicon 15 is replaced with a neighboring data reader 23. The neighboring data reader 23 gives the dummy word adder 14 neighboring data instead of dummy words. The dummy word adder 14 adds the neighboring data to a sequence data item, and stores the resulting data items in the recognition reference word lexicon 16. The expression "neighboring data" signifies data which lie in the neighborhood of the sequence data item to-be-currently-inputted among the sequence data items stored in the sequence data lexicon 13. The neighboring data reader 23 reads out the neighboring data of the sequence data item to-be-currently-inputted, and affords them to the dummy word adder 14.

Figure 12:
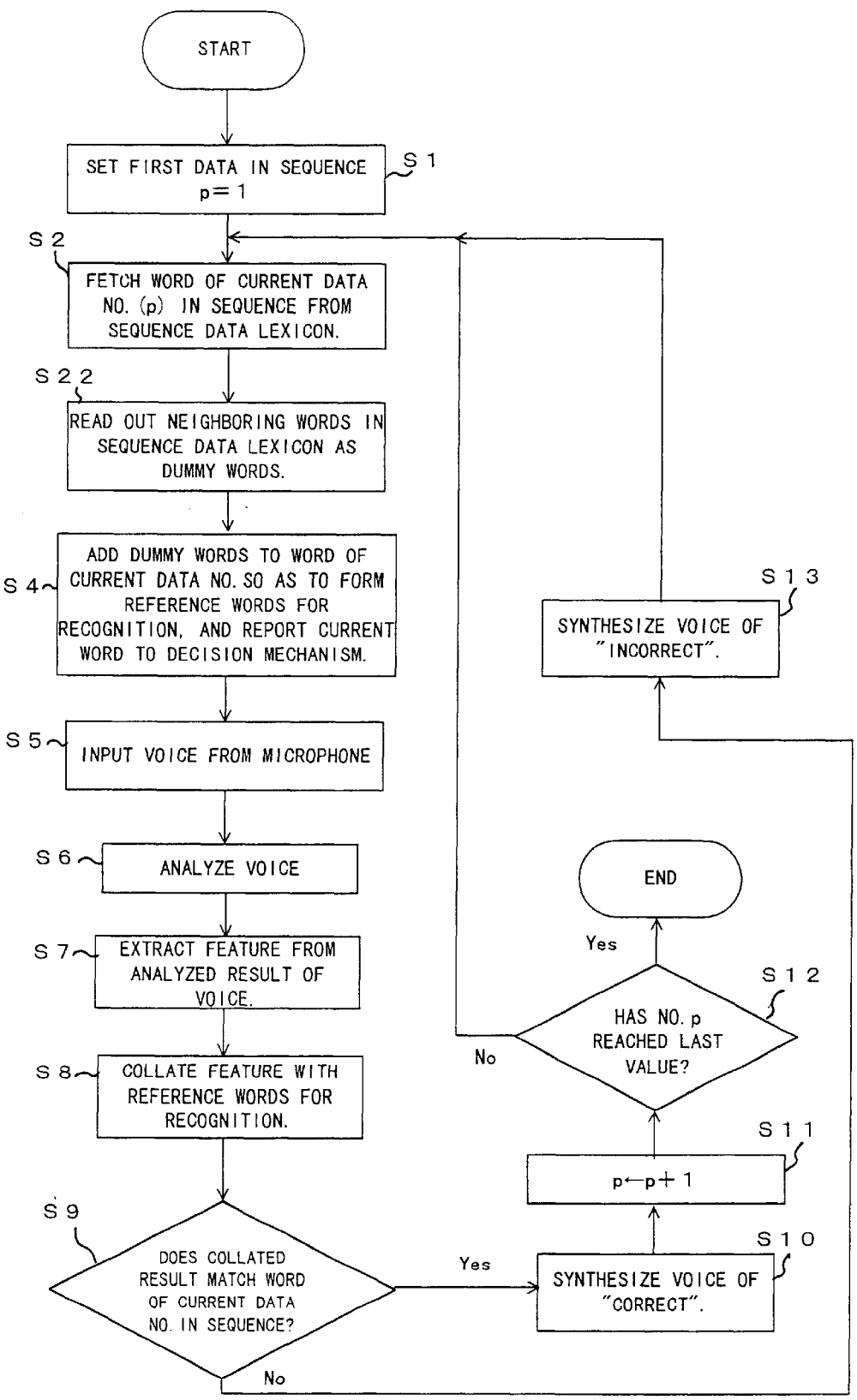
FIG. 12 is a flow chart showing a general process in the fourth aspect of performance.

FIG. 12 is a flow chart showing a general process in the fourth aspect of performance of the speech recognition system for sequence data as illustrated in FIG. 11. As compared with the process in the first aspect of performance illustrated in, for example, FIG. 3B, the process in the fourth aspect of performance differs in the point that dummy words are read out from among neighboring words in the sequence data lexicon 13 at step S22, instead of the dummy words generated anew at step S3 in FIG. 3B. The readout of the neighboring words will be explained with reference to FIGS. 13 and 14 below.

FIG. 13 illustrates a practicable example of sequence data items which are stored in the sequence data lexicon 13 depicted in FIG. 11. Referring to FIG. 13, the names of the stations of the Yamanote Loop Line beginning with "Shinjuku" are stored as "Yoyogi", "Harajuku", . . . in correspondence with the values of a variable i which indicates the number of each sequence data item.

Figure 14:
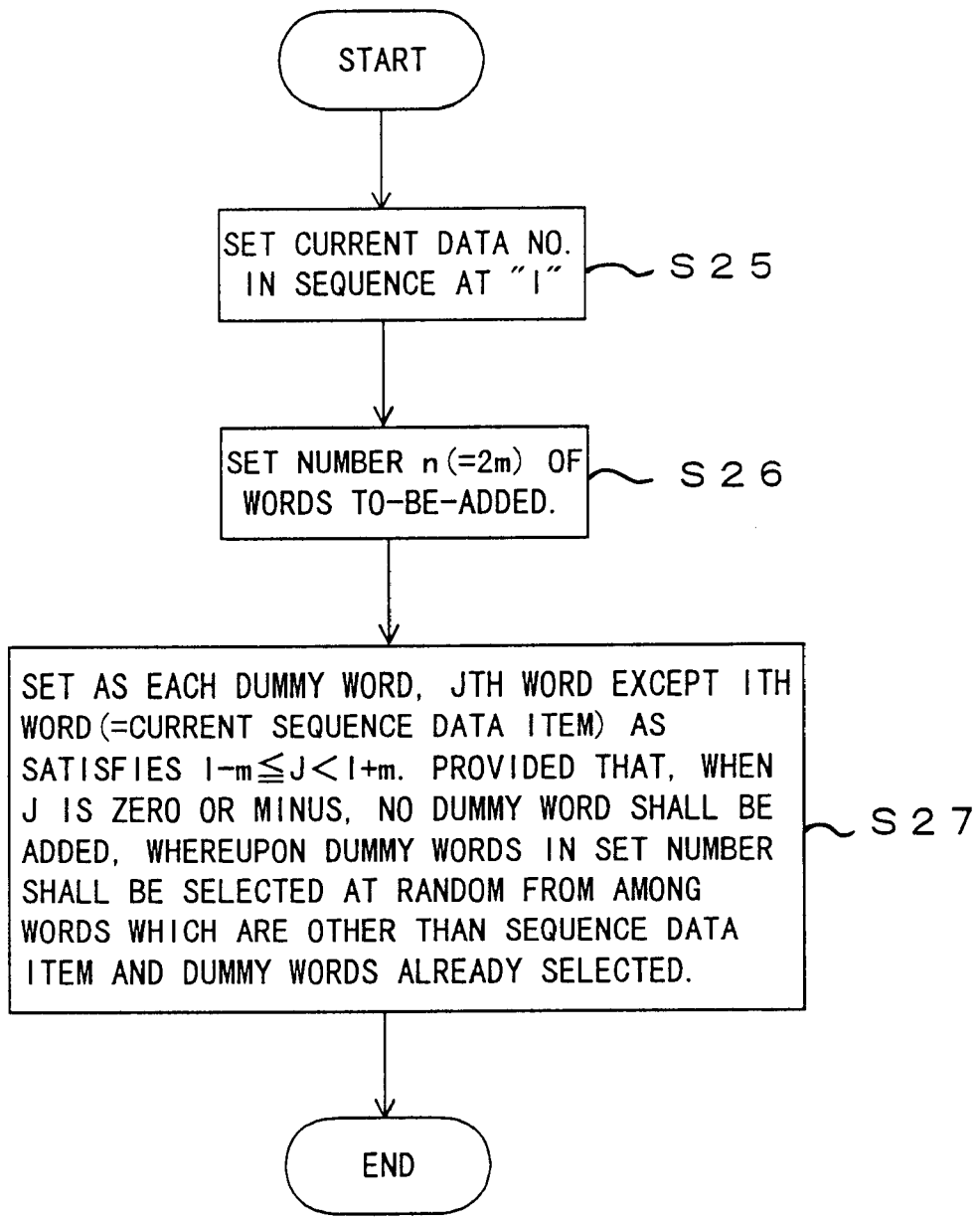
FIG. 14 is a flow chart showing a process which is executed by a dummy word adder depicted in FIG. 11.

FIG. 14 is a flow chart showing the process of the dummy word adder 14 depicted in FIG. 11. Referring to FIG. 14, when the process is started, the current order corresponding to the number i in FIG. 13 is set at "I" at step S25. At step S26, the number of words to be added is set at: n=2 m. At step S27, Jth words satisfying the following inequality (Expression 1) except the Ith word, namely, the sequence data item to-be-currently-inputted are added as neighboring data, namely, dummy words, whereupon the process is ended:

$$I-m \leq J < I+m \qquad \text{(Expression 1)}$$

However, when J becomes zero or minus, any corresponding dummy word is not added, and dummy words in the set number are selected at random from among words which are other than the sequence data to-be-currently-inputted and the neighboring data already selected. The dummy words thus selected are added.

Besides, the inequality for determining the neighboring data is not restricted to the (Expression 1) mentioned above. It is also allowed to find k satisfying n=3k and to employ either of the following two inequalities:

$$I-k \leq J < I+2k \qquad \text{(Expression 2)}$$

$$I-2k \leq J < I+k \qquad \text{(Expression 3)}$$

That is, it suffices that n data items before and behind the Ith sequence data item as stored in the sequence data lexicon 13 can be selected as the neighboring data. Accordingly, even when symbols $\leq$ and $<$ contained in the above inequalities (Expression 1), (Expression 2) and (Expression 3) are replaced with one another, quite no problem is posed. Alternatively, the neighboring data may well be extracted at random from among sequence data items which lie within a predetermined range from the Ith sequence data item.

Further, in the case where J becomes zero or minus, the dummy data items need not always be selected to the number n which is the number of the words to-be-added. Moreover, even in the case of adding the words to the number n, the range which the inequality satisfies may well be broadened by increasing the value m or k in the inequality.

In a case where the neighboring data of sequence data are employed as dummy data, dummy data for exclusive use need not be separately prepared, so that the capacity of a memory can be saved, and that the operation of inputting the dummy data for exclusive use can be omitted.

Figure 15:
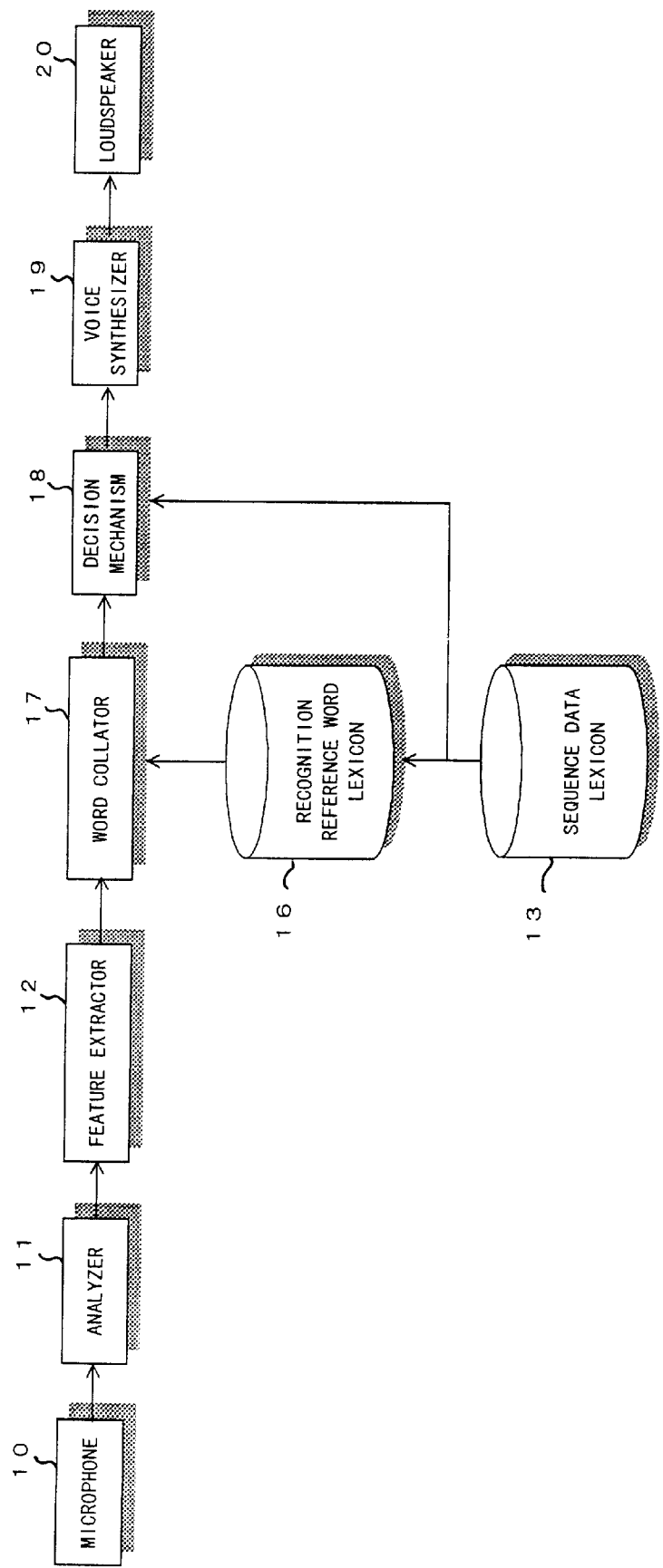
FIG. 15 is a block diagram showing an architecture in the fifth aspect of performance of a speech recognition system for sequence data.

FIG. 15 is a block diagram showing an architecture in the fifth aspect of performance of a speech recognition system for sequence data. As compared with the first aspect of performance illustrated in FIG. 3A, the fifth aspect of performance differs in the point that the dummy word adder 14 and the dummy word lexicon 15 are not included, and that all the sequence data items of the sequence data lexicon 13 are afforded to the recognition reference word lexicon 16 and are directly afforded to the word collator 17 as recognition reference words for speech recognition. That is, the fifth aspect of performance is considered as the example of the simplest architecture of the speech recognition system having no prior-art example as explained in the section "Description of the Related Art". The architecture is possible as one aspect of performance though it has problems as stated before.

What is claimed is:

1. A speech recognition system recognizing voices of sequence data which ought to be inputted in regular, predetermined order, comprising:

recognition-reference-word generation unit generating a recognition reference word by adding at least one item of dummy data in all items of the sequence data which ought to be inputted in regular, predetermined order to each item of the sequence data as ought to be currently inputted in predetermined order, thereby to form a recognition reference words for the speech rocognition;

speech recognition means for recognizing and outputting the recognition reference word which is the most similar to an externally inputted voice among the recognition reference words, as a recognized result on the basis of a feature of the input voice; and a decision unit deciding by comparing the recognized result of said speech recognition unit with the data item which ought to be currently inputted in the predetermined order, so as to decide a match between said recognized result and said data item.

2. A speech recognition system for sequence data as recited in claim 1, wherein the dummy data are neighboring data which lie in the neighborhood of the data item to-be-currently-inputted, in said sequence data.

3. A speech recognition system for sequence data as recited in claim 2, further comprising a display unit displaying those recognition reference words for said speech recognition in which said at least one item of dummy data has been added.

4. A speech recognition system for sequence data as recited in claim 1, further comprising a display unit displaying those recognition reference words for said speech recognition in which said at least one item of dummy data has been added.

5. A speech recognition system as recited in claim 1, further comprising:

a dummied-sequence-data storage unit storing data which have been obtained by adding at least one item of dummy data in all items of the sequence data which ought to be inputted in regular, predetermined order to each item of the sequence data as ought to be currently inputted in predetermined order, wherein the speech recognition unit recognizing and reading out the sequence data item which ought to be currently inputted in the predetermined order, as well as at least one dummy data item which corresponds to said sequence data item, from said dummied-sequence data storage unit, thereby to form a set of recognition reference words for the speech recognition, and outputting the recognition reference word which is the most similar to an externally inputted voice among the recognition reference words, as a recognized result on the basis of a feature of the input voice.

6. A speech recognition system for recognizing voices of sequence data which ought to be inputted in regular, predetermined order, comprising:

a dummied-sequence-data storage unit storing data which have been obtained by adding at least one item of dummy data in all items of the sequence data which ought to be inputted in regular, predetermined order to each item of the sequence data as ought to be currently inputted in predetermined order;

a speech recognition unit recognizing and reading out the sequence data item which ought to be currently inputted in the predetermined order, as well as at least one dummy data item which corresponds to said sequence data item, from said dummied-sequence data storage unit, thereby to form a set of recognition reference words for the speech recognition, and outputting the recognition reference word which is the most similar to an externally inputted voice among the recognition reference words, as a recognized result on the basis of a feature of the input voice; and a decision unit deciding by comparing the recognized result of said speech recognition unit with the data item which ought to be currently inputted in the predetermined order, so as to decide a match between said recognized result and said data item.

7. A speech recognition system for sequence data as recited in claim 6, wherein the dummy data are neighboring data which lie in the neighborhood of the data item to-be-currently-inputted, in said sequence data.

8. A speech recognition system for sequence data as recited in claim 7, further comprising a display unit displaying those recognition reference words for said speech recognition in which said at least one item of dummy data has been added.

9. A speech recognition system for sequence data as recited in claim 6, further comprising a display unit displaying those recognition reference words for said speech recognition in which said at least one item of dummy data has been added.

10. A computer-readable storage medium storing a program for recognizing spoken words based upon and corresponding to sequence data which ought to be inputted in regular, predetermined order, said program causing a computer to execute:

generating a recognition reference word by adding at least one item of dummy data for all items of the sequence data which ought to be inputted in regular, predetermined order to each item of the sequence data as ought to be currently inputted in predetermined order, thereby to form a set of recognition reference words for speech recognition;

comparing an inputted word included in the spoken words with each word in the set of the recognition reference words;

determining whether characteristics of the inputted word are most similar to those of one of the words included in the set of recognition reference words as a word to be inputted;

recognizing and outputting the recognition reference word which is the most similar to the externally inputted word among the recognition reference words, as a recognized result on the basis of a feature of the input spoken word; and comparing the recognized result with the each item of the sequence data as ought to be currently inputted in the predetermined order, so as to decide a match between said recognized result and said each item of the sequence data as ought to be currently inputted in the predetermined order.

11. A computer-readable storage medium storing a program for recognizing spoken words based upon corresponding to sequence data which ought to be inputted in regular, predetermined order, said program causing a computer to execute:

reading out the sequence data item from a dummied-sequence-data storage unit which stores data obtained by adding at least one item of dummy data in all items of the sequence data which ought to be inputted in regular, predetermined order to each sequence data item, the sequence data item which is to be currently inputted in predetermined order, as well as at least one dummy data item which corresponds to said sequence data item, thereby to form a set of recognition reference words for speech recognition;

comparing an inputted word of the spoken words with each word in the set of the recognition reference words;

determining whether characteristics of the inputted word are most similar to those of a word included in the set of the recognition reference words as a word to be inputted; and outputting the recognition reference word which is the most similar to the externally inputted word among the recognition reference words, as a recognized result on the basis of a feature of the input spoken word; and comparing the recognized result with the each item of the sequence data as ought to be currently inputted in the predetermined order, so as to decide a match between said recognized result and said each item of the sequence data as ought to be currently inputted in the predetermined order.

12. A speech recognition method for recognizing spoken words corresponding to sequence data which ought to be inputted in regular, predetermined order, comprising:

generating a recognition reference word by adding at least one item of dummy data for all items of the sequence data which ought to be inputted in regular, predetermined order to each item of the sequence data as ought to be currently inputted in predetermined order, thereby to form a set of recognition reference words for speech recognition;

comparing an inputted word included in the spoken words with each word in the set of the recognition reference words;

determining whether characteristics of the inputted word are most similar to those of one of the words included in the set of recognition reference words as a word to be inputted;

recognizing and outputting the recognition reference word which is the most similar to the externally inputted word among the recognition reference words, as a recognized result on the basis of a feature of the input spoken word; and comparing the recognized result with the each item of the sequence data as ought to be currently inputted in the predetermined order, so as to decide a match between said recognized result and said each item of the sequence data as ought to be currently inputted in the predetermined order.

13. A speech recognition method for recognizing spoken words corresponding to sequence data which ought to be inputted in regular, predetermined order, comprising:

reading out the sequence data item from a dummied-sequence-data storage unit which stores data obtained by adding at least one item of dummy data in all items of the sequence data which ought to be inputted in regular, predetermined order to each sequence data item, the sequence data item which is to be currently inputted in predetermined order, as well as at least one dummy data item which corresponds to said sequence data item, thereby to form a set of recognition reference words for speech recognition;

comparing an inputted word of the spoken words with each word in the set of the recognition reference words;

determining whether characteristics of the inputted word are most similar to those of a word included in the set of the recognition reference words as a word to be inputted;

outputting the recognition reference word which is the most similar to the externally inputted word among the recognition reference words, as a recognized result on the basis of a feature of the input spoken word; and comparing the recognized result with the each item of the sequence data as ought to be currently inputted in the predetermined order, so as to decide a match between said recognized result and said each item of the sequence data as ought to be currently inputted in the predetermined order.

* * * * *

UNITED STATES PATENT AND TRADEMARK OFFICE
CERTIFICATE OF CORRECTION

PATENT NO. : 6,298,325 B1
DATED : October 2, 2001
INVENTOR(S) : Shinta Kimura et al.

It is certified that error appears in the above-identified patent and that said Letters Patent is hereby corrected as shown below:

Column 11,
Line 5, before "recognition-reference-word" insert -- a --
Line 11, before "recognition" (first occurrence) insert -- set of --
Line 11, change "rocognition" to -- recognition --
Line 12, before "speech" insert -- a --
Line 12, change "means for" to -- unit --

Signed and Sealed this

Twenty-fifth Day of June, 2002

Attest:

Attesting Officer

JAMES E. ROGAN
*Director of the United States Patent and Trademark Office*